United States Patent
Chen et al.

(10) Patent No.: US 7,832,872 B2
(45) Date of Patent: Nov. 16, 2010

(54) PROJECTOR

(75) Inventors: Chien-Fu Chen, Taoyuan (TW);
Hung-Yen Huang, Taoyuan (TW);
Hung-Jen Wei, Taoyuan (TW)

(73) Assignee: Qisda Corporation, Taoyuan County (TW)

(*) Notice: Subject to any disclaimer, the term of this patent is extended or adjusted under 35 U.S.C. 154(b) by 927 days.

(21) Appl. No.: 11/676,321

(22) Filed: Feb. 19, 2007

(65) Prior Publication Data
US 2007/0195281 A1  Aug. 23, 2007

(30) Foreign Application Priority Data
Feb. 20, 2006 (TW) .............................. 95105565 A

(51) Int. Cl.
G03B 21/16 (2006.01)
G03B 21/18 (2006.01)
G03B 21/26 (2006.01)
F21V 29/00 (2006.01)

(52) U.S. Cl. .............................. 353/61; 353/52; 353/57; 362/294

(58) Field of Classification Search .................. 353/52, 353/57, 60–61, 119; 362/294, 345, 373
See application file for complete search history.

(56) References Cited

U.S. PATENT DOCUMENTS

| | | | |
|---|---|---|---|
| 6,280,038 B1 * | 8/2001 | Fuse et al. ..................... 353/57 |
| 6,334,686 B1 * | 1/2002 | Shiraishi et al. ................ 353/57 |
| 6,364,492 B1 * | 4/2002 | Fujimori et al. .............. 353/119 |
| 6,422,703 B1 * | 7/2002 | Wang et al. .................... 353/61 |
| 6,435,699 B2 * | 8/2002 | Glowach et al. ............. 362/294 |
| 6,497,489 B1 * | 12/2002 | Li et al. ......................... 353/61 |
| 6,565,215 B2 * | 5/2003 | Barrau et al. ................ 353/119 |
| 6,976,760 B2 | 12/2005 | Ito et al. |
| 7,021,768 B2 * | 4/2006 | Fuse et al. ..................... 353/61 |
| 7,144,118 B2 * | 12/2006 | Hsu et al. ...................... 353/61 |
| 7,210,825 B2 * | 5/2007 | Watanabe et al. ............ 362/373 |
| 7,367,679 B2 * | 5/2008 | Emery .......................... 353/60 |
| 7,607,782 B2 * | 10/2009 | Chen et al. .................... 353/61 |
| 2005/0036115 A1 * | 2/2005 | Kim et al. ...................... 353/61 |
| 2006/0170876 A1 * | 8/2006 | Takemi et al. ................. 353/61 |

FOREIGN PATENT DOCUMENTS

JP         2005173085 A      6/2005

* cited by examiner

*Primary Examiner*—Georgia Y Epps
*Assistant Examiner*—Jori S Reilly-Diakun

(57) ABSTRACT

The invention discloses a projector including a light-source device, a guiding passage, and a fan. The light-source device includes a light-source lamp for emitting light. The guiding passage has an outlet and an inlet. There is a block disposed in the vicinity of the outlet. The outlet of the guiding passage is connected to the light-source device, and the inlet of the guiding passage is connected to the fan. The fan blows an air flow into the guiding passage. When the air flow passes through the block disposed in the vicinity of the outlet, the air flow will be divided into a first air flow and a second air flow. Afterward, the first air flow cools a first portion of the light-source device, and the second air flow cools a second portion of the light-source device. Accordingly, temperature of the light-source lamp can be stably maintained.

8 Claims, 7 Drawing Sheets

PROJECTOR

BACKGROUND OF THE INVENTION

1. Field of the invention

This present invention relates to a projector, and, more particular, to a projector capable of stably maintaining the temperature of the light-source lamp in all conditions.

2. Description of the prior art

A projector is used not only in common office meetings but also in various academic courses or seminars because a projector can function as a media player. It could be foreseen that the usage of projectors is getting more and more diversified as applications of projectors are getting wider and wider. Generally speaking, a projector is either disposed on a desk or hung under the ceiling. For the consideration of various applications, a projector has been developed to work as both a desktop type and a ceiling-mounted type.

All projectors mentioned above have a cooling structure, which uses a fan to blow an external air flow into the casing of the projectors for cooling the heat produced by the heat source, e.g. a light-source lamp. However, comparing a projector disposed on a desk with a projector hung under the ceiling, the heat distributions of the heat sources are different. A cooling structure of a desktop projector will not be suitable for cooling the temperature of the light-source lamp of a ceiling-mounted projector, i.e. the cooling structure will not be able to maintain the stability of the temperature of the light-source lamp, thus shortening the life of the light-source lamp, and vice versa.

Accordingly, a scope of the present invention provides a guiding passage of a projector to solve the above problems such that the temperature of the light-source lamp of the projector, operating in the desktop type or the ceiling-mounting type, can be cooled well and be stably maintained.

SUMMARY OF THE INVENTION

A scope of the present invention is to provide a projector. There is a block disposed in the vicinity of the outlet of the guiding passage of the projector, used for cooling a light-source lamp of the projector, such that when an air flow passes the block, the air flow is divided into a first air flow and a second air flow. The first air flow cools the first portion of the light-source lamp, and the second air flow cools the second portion of the light-source lamp. Therefore, the temperature of the light-source lamp can be stably maintained, whether the projector is placed on a desktop or hung under the ceiling.

According to a preferred embodiment, a projector of the present invention includes a light-source device, a guiding passage, and a fan. The light-source device includes a light-source lamp for emitting light. The guiding passage has an outlet and an inlet, and a block is disposed in the vicinity of the outlet. The outlet of the guiding passage is connected to the light-source device. The fan is connected to the inlet of the guiding passage for directing the air flow into the guiding passage.

According to the preferred embodiment, when the air flow passes the block in the vicinity of the outlet of the guiding passage, the air flow is divided into a first air flow and a second air flow. The first air flow cools the first portion of the light-source lamp, and the second air flow cools the second portion of the light-source lamp; thus, the temperature of the light-source lamp is stably maintained.

Therefore, according to the projector of the present invention, because there is a block disposed in the vicinity of the outlet of the guiding passage for dividing the air flow, the temperature of the light-source lamp of the projector is stably maintained, whether the projector is disposed on a desk or hung under the ceiling.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
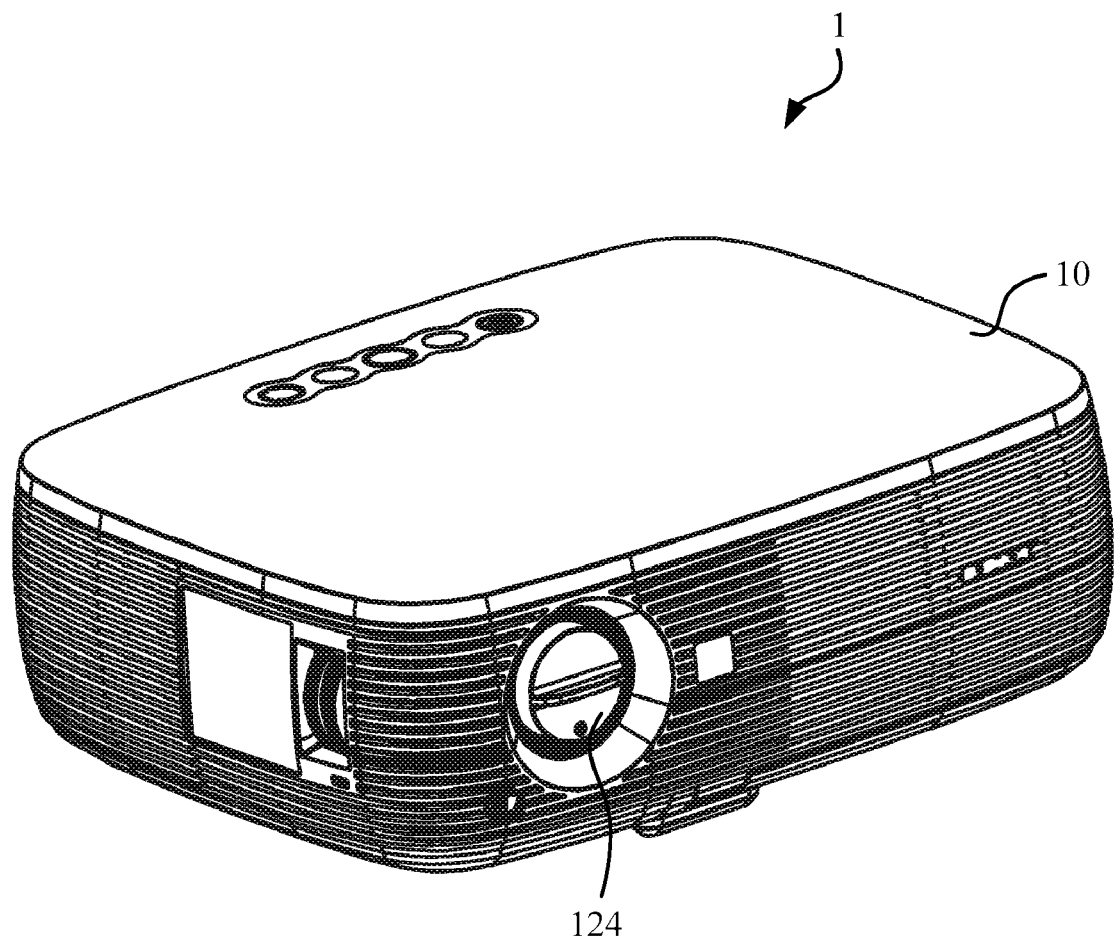
FIG. 1 is an exterior view of the projector according to the preferred embodiment of the present invention.
Figure 2:
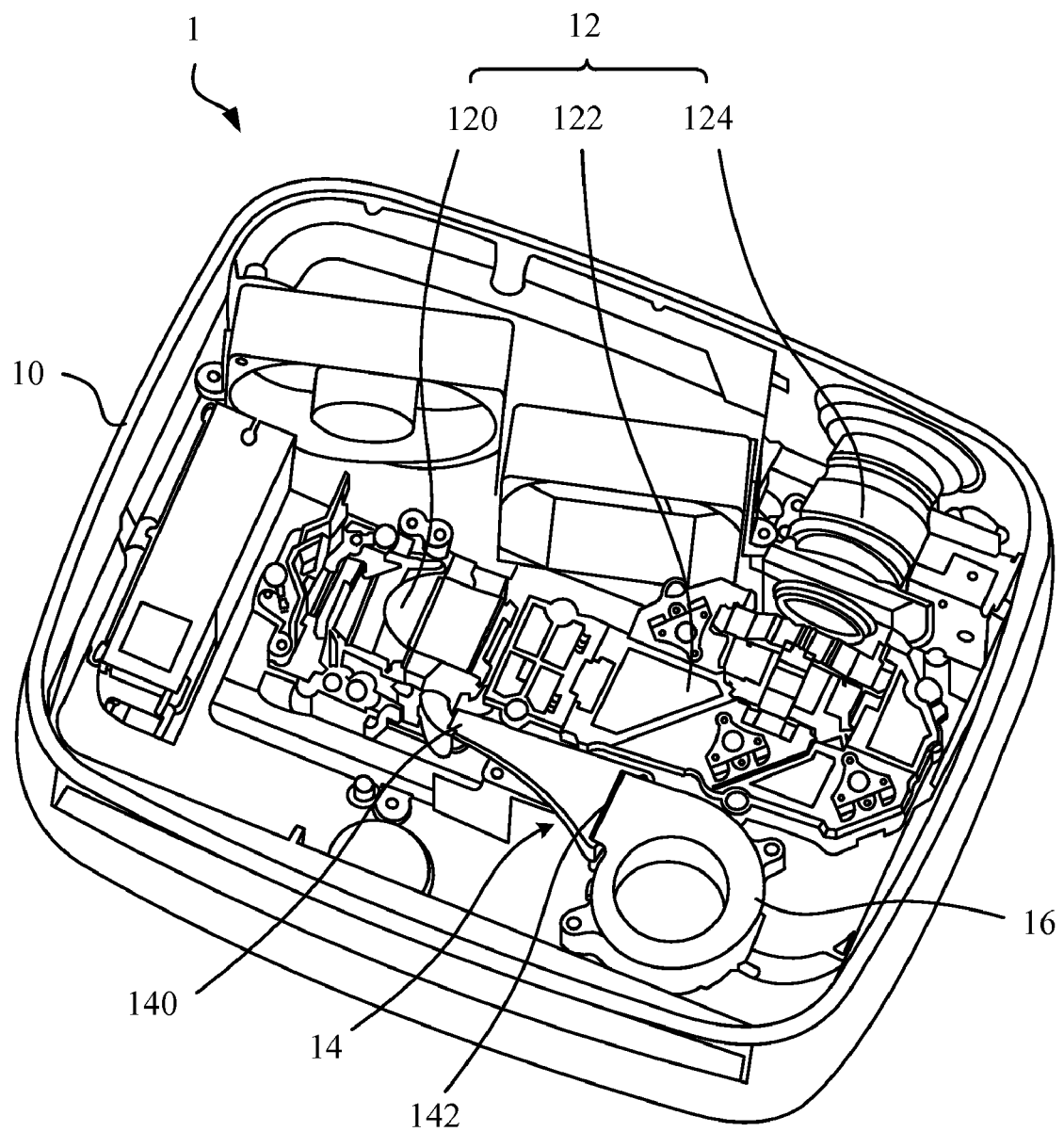
FIG. 2 is an interior view of the projector according to the preferred embodiment of the present invention.

Referring to FIG. 1 and FIG. 2, FIG. 1 is an exterior view of the projector 1 according to a preferred embodiment of the present invention. FIG. 2 is an interior view of the projector 1. The projector 1 includes a casing 10, an optical system 12, a guiding passage 14, and a fan 16. The casing 10 encapsulates the optical system 12, the guiding passage 14, and the fan 16, as shown in FIG. 2. The optical system 12 includes a light-source device 120, an optical module 122, and projection lens 124.

Figure 3:
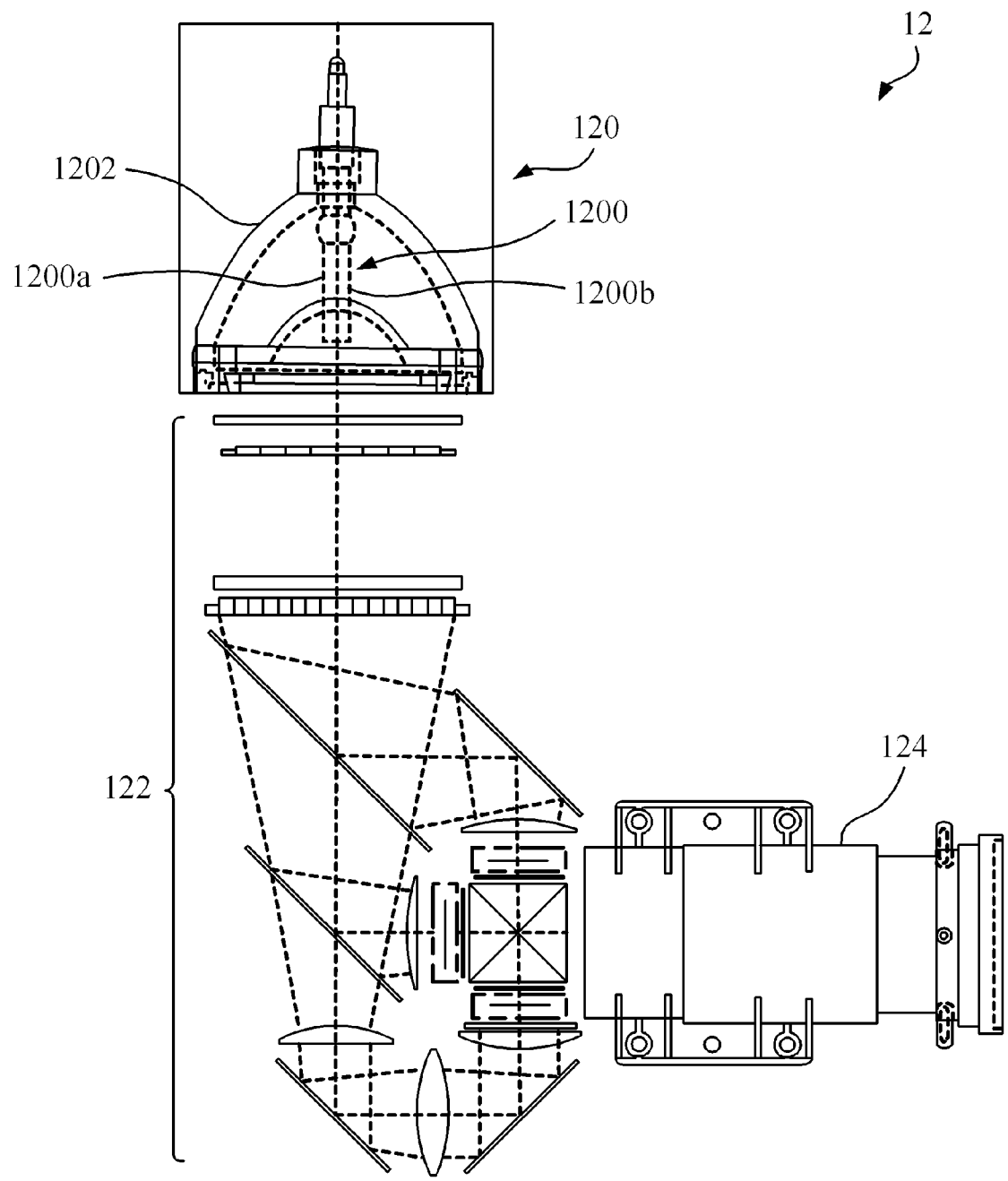
FIG. 3 is a schematic diagram illustrating the optical system shown in FIG. 2.

Referring to FIG. 3, FIG. 3 is a schematic diagram illustrating the optical system 12 shown in FIG. 2. The light-source device 120 includes a light-source lamp 1200. The light-source lamp 1200 emits light, which is processed through the optical module 122 and then is projected via the projection lens 124. Since the principle of the formation of image for the optical system 12 is well-known to a skilled person, this will not be further described.

Figure 4:
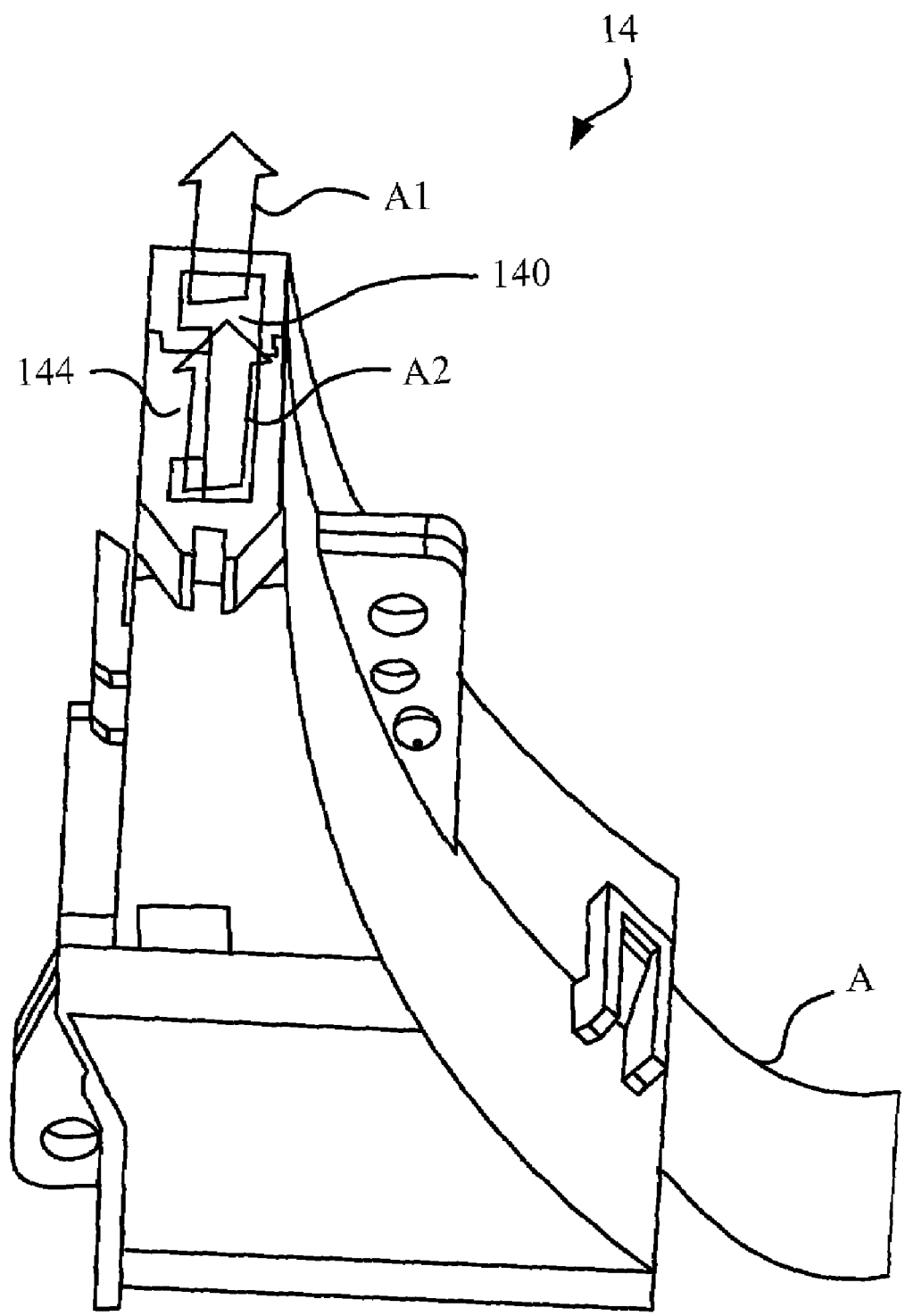
FIG. 4 is an exterior view of the guiding passage shown in FIG. 2.
Figure 5:
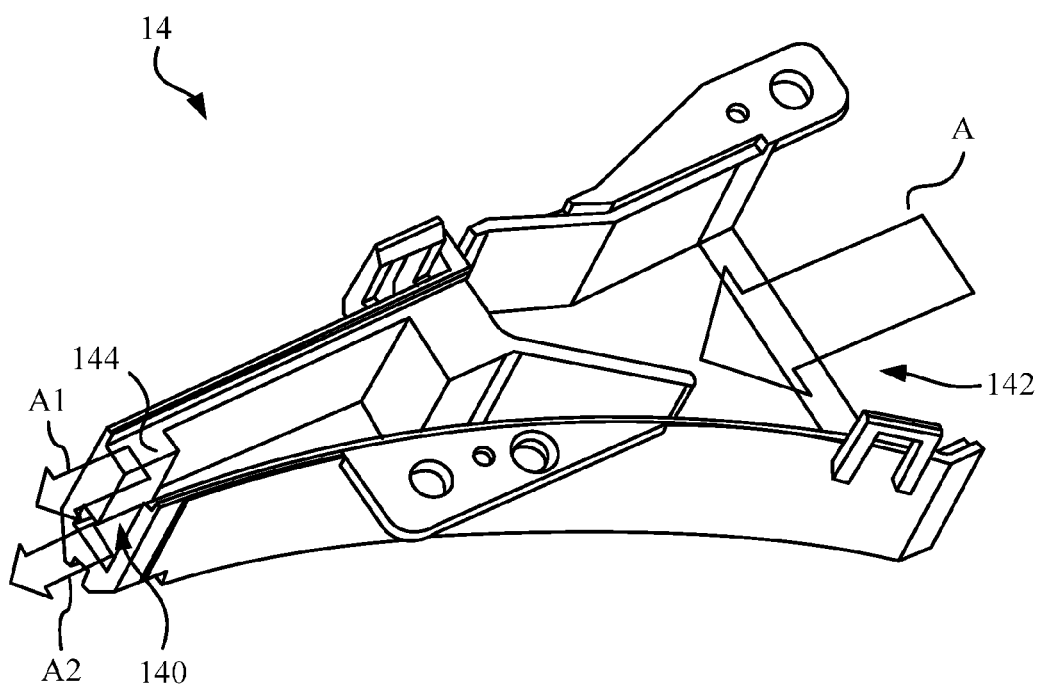
FIG. 5 is an interior view of the guiding passage shown in FIG. 4.

Referring to FIG. 4 and FIG. 5, FIG. 4 is an exterior view of the guiding passage 14 shown in FIG. 2. FIG. 5 is an interior view of the guiding passage 14 shown in FIG. 4. The guiding passage 14 has an outlet 140 and an inlet 142. There is a block 144 disposed in the vicinity of the outlet 140. Referring to FIG. 2 together, the outlet 140 is connected to the light-source device 120 of the optical system 12, and the inlet 142 is connected to the fan 16.

Figure 6:
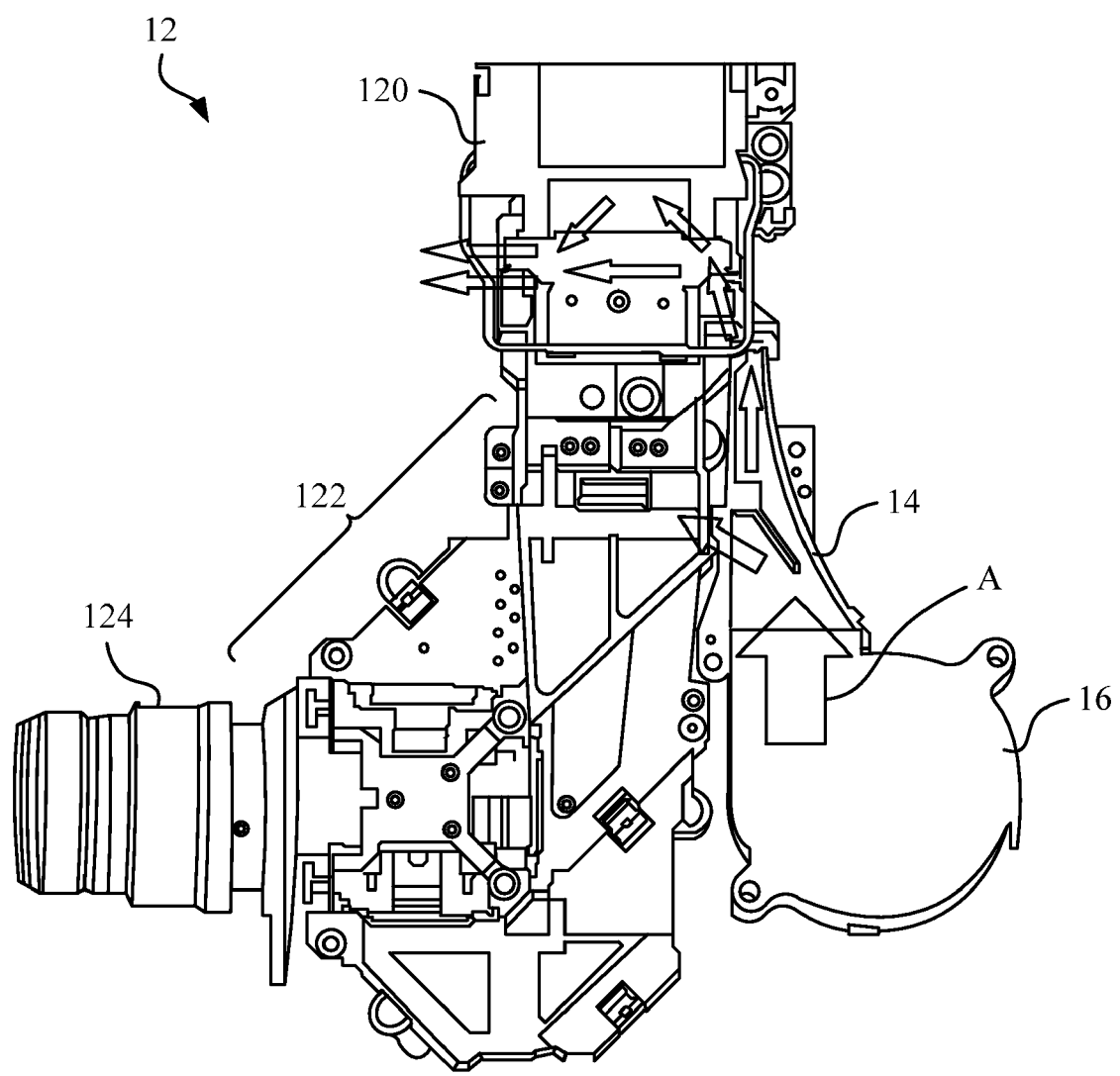
FIG. 6 is a schematic diagram illustrating the path of an air flow.

Referring to FIG. 6, FIG. 6 is a schematic diagram illustrating the path of an air flow A. Referring to FIGS. 2 through 5 together, the fan 16 blows the air flow into the guiding passage 14. When the air flow A passes the block 144 disposed in the vicinity of the outlet 140 of the guiding passage 14, the air flow A is divided into a first air flow A1 and a second air flow A2. The first air flow A1 enters the light-source device 120 and then cools a first portion 1200a of the light-source lamp 1200, and the second air flow A2 enters the light-source device 120 and then cools a second portion 1200b of the light-source lamp 1200. Whereby, the first air flow A1 and the second air flow A2 take away the heat produced by the light-source lamp 1200, so as to achieve the purpose of cooling the light-source lamp 1200. By controlling the power of the air flow A, the heat token away by the first air flow A1 and the second air flow A2 is controlled. In other words, the temperature of the light-source lamp 1200 can be stably maintained. Besides, the temperature of the light-source lamp 1200 of the projector 1 is stably maintained, whether the projector is disposed on a desk or hung under the ceiling.

Figure 7:
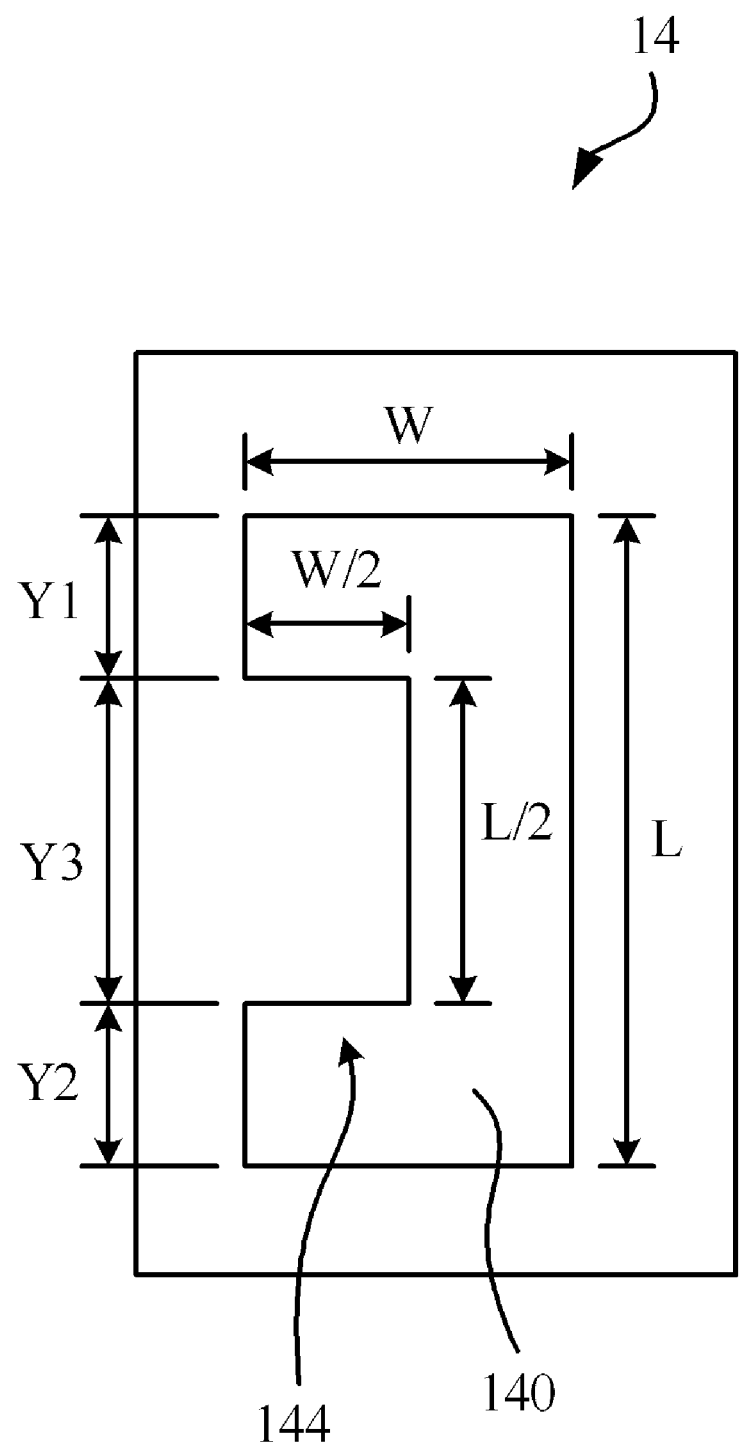
FIG. 7 is a front view of the outlet of the guiding passage shown in FIG. 4.

In the preferred embodiment, the block 144 is designed as a cuboid, as shown in FIG. 5. Referring to FIG. 7, FIG. 7 is a front view of the outlet 140 of the guiding passage 14 shown in FIG. 4. As shown in FIG. 7, the outlet 140 of the guiding passage 14 has a cross section with a length of L and a width of W. In a better condition, the exposed block 144 is designed with a range of L/3~2L/3 in length and a range of W/3~2W/3 in width, and the cooling effect will be better but not limited by this. The length of the block 144, shown in FIG. 7, is designed with a range of L/2 in length and a range of W/2 in width.

In the preferred embodiment, as shown in FIG. 7, the cross section of the outlet 140 of the guiding passage 14 is divided into a first interval Y1 and a second interval Y2 by the block 144, wherein Y1 is not equal to Y2. The first air flow A1 enters the light-source device 120 through the first interval Y1, so as to cool the first portion 1200$a$ of the light-source lamp 1200, and the second air flow A2 enters the light-source device 120 through the second interval Y2, so as to cool the second portion 1200$b$ of the light-source lamp 1200.

In another preferred embodiment, the block 144 could be designed as a triangular cylinder or a quarter sphere to improve the cooling effect.

Comparing with the prior art, because the projector of the invention includes a block which is disposed in the vicinity of the outlet of the guiding passage for cooling the light-source device and properly divides the entered air flow, the temperature of the light-source lamp could be stably maintained, whether the project is disposed on a desk or hung under the ceiling. Additionally, changing the shape of the block could also enhance the effect of cooling.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A projector, comprising:
   a light-source device comprising a light-source lamp for emitting a light and a reflection cover, the light-source lamp being disposed in an internal space of the reflection cover;
   a guiding passage having an inlet and an outlet, the outlet being disposed adjacent to the light-source lamp;
   a block, disposed in the vicinity of the outlet, a length and a width of a cross section of the block being smaller than a length and a width of a cross section of the outlet respectively, the cross section of the outlet being divided into a first interval Y1, a second interval Y2, and a third interval Y3 by the block, the third interval Y3 being located between the first interval Y1 and the second interval Y2; and
   a fan, disposed adjacent to the inlet of the guiding passage, for blowing an air flow into the guiding passage;
   wherein when the air flow passes the block, the air flow is divided into a first air flow, a second air flow, and a third air flow, the first air flow enters the internal space and cools a first portion of the light-source lamp, the second air flow enters the internal space and cools a second portion of the light-source lamp, and the third air flow enters the internal space and cools a third portion of the light-source lamp, thereby, the temperature of the light-source lamp is maintained stably.

2. The projector of claim 1, wherein the block exhibits a cuboid.

3. The projector of claim 2, wherein the cross section of the outlet of the guiding passage has a length of L, and the length of the block is in a range of L/3 to 2L/3.

4. The projector of claim 2, wherein the cross section of the outlet of the guiding passage has a width of W, and the width of the block is in a range of W/3 to 2W/3.

5. The projector of claim 1, wherein the block exhibits a triangular cylinder.

6. The projector of claim 1, wherein the block exhibits a quarter sphere.

7. The projector of claim 1, further comprising a casing for accommodating the light-source device, the guiding passage, and the fan.

8. The projector of claim 3, wherein Y1 is not equal to Y2.

* * * * *